Nov. 3, 1964  M. G. DEPPE  3,155,323
ILLUMINATION ATTACHMENT FOR BINOCULARS OR THE LIKE
Filed July 12, 1962  2 Sheets-Sheet 1

Milton G. Deppe
INVENTOR.

Nov. 3, 1964   M. G. DEPPE   3,155,323
ILLUMINATION ATTACHMENT FOR BINOCULARS OR THE LIKE
Filed July 12, 1962   2 Sheets-Sheet 2
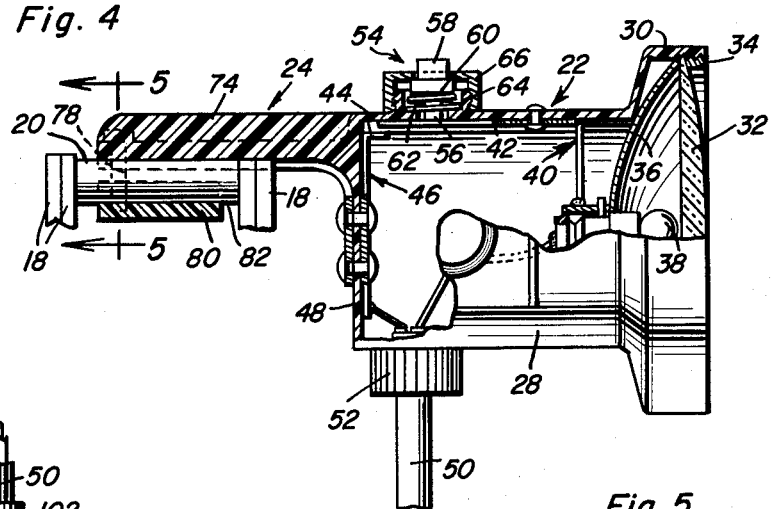
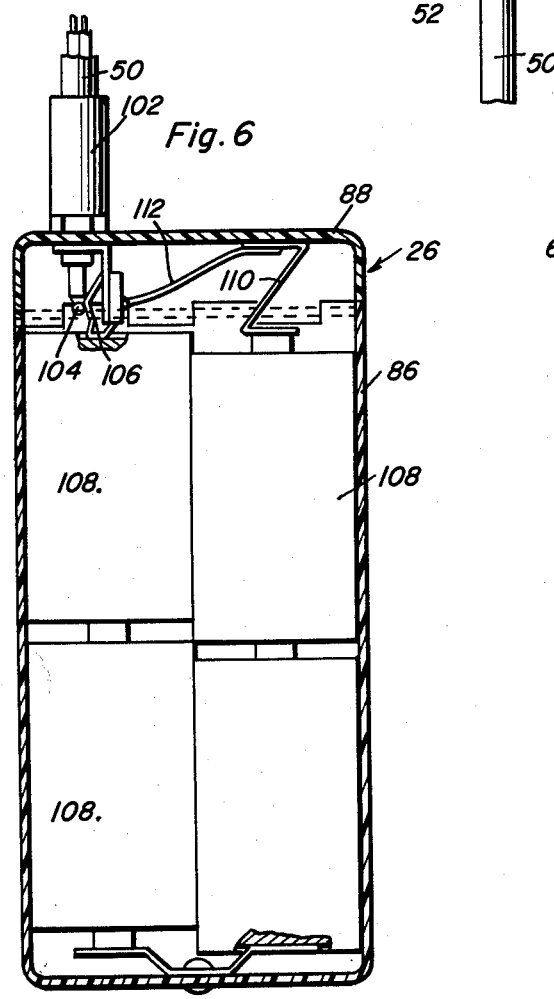
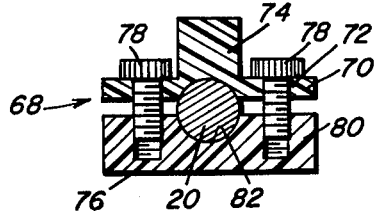
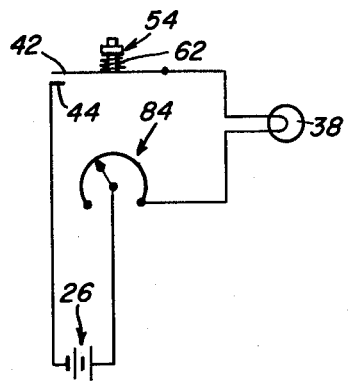
Milton G. Deppe
INVENTOR.

United States Patent Office 3,155,323
Patented Nov. 3, 1964

3,155,323
ILLUMINATION ATTACHMENT FOR
BINOCULARS OR THE LIKE
Milton G. Deppe, 105 N. 5th St., Bellevue, Iowa
Filed July 12, 1962, Ser. No. 209,412
3 Claims. (Cl. 240—6.4)

The present invention relates to illumination, more particularly, a controllable light beam emanating from a simple light source and has to do with a simple and expedient attachment for an optical device, for example, binoculars.

Binoculars are categorized in respect to the particular purpose for which they are intended and adapted depending on whether they are designed for daylight, twilight, or night as the case may be.

Despite the fact that efficiently constructed binoculars have prerequisite built-in facilities in respect to magnification of the field of view, relative brightness, contrast relative to the depth of the image and so on, there are nevertheless situations wherein such facilities diminish twilight capacity and night efficiency. Therefore and with a view toward more favorable focusing and object finding results a desirable and needed controllable source of light for illumination is herein revealed. Whereas this regulatable source of artificial illumination could be an integral or built in feature it is preferably in the nature of a simple, practical and efficient flashlight comprising an attachment which can be readily attached to many different makes and types of binoculars now on the market.

A pair of binoculars equipped with this added manually controllable source of illumination can be used with reliability by contributing a beam of light which may be projected to the field of view in a manner to achieve pinpoint focusing of the objective and clarity of delineation for hunting, use at sports events or for whatever purpose needed.

Briefly summarized the concept pertains to the combination of suitably constructed binoculars wherein spaced parallel barrels having eyepieces and lenses are interconnected by assembling and hinging components which go to make up the frame. Speaking generally the frame in the instant situation is equipped with an attachable and detachable illumination device or attachment resembling a flashlight but which is novel in that the casing is provided with an accessibly positioned switch and is further provided with means for bracketing the casing on the aforementioned frame.

In carrying out a preferred embodiment of the invention the cylinder has the switch means poised and situated in a position relative to the component parts of the binoculars whereby it is accessible and consequently easily and readily usable.

The invention also features a suitable rheostat which has an operating button on one side of the casing and adjacent to the switch button and which is available to vary the intensity of the light beam in keeping with the focusing and available natural light (twilight or darkness) existing at the time of use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a view in section and elevation on a slightly larger scale, taken approximately on the plane of the section line 4—4 of FIGURE 1 looking in the direction of the indicating arrows;

FIGURE 5 is a view on a slightly enlarged scale taken on the section line 5—5 of FIGURE 4;

FIGURE 6 is a view taken on the section line 6—6 of FIGURE 2; and

FIGURE 7 is a view depicting the wiring diagram on a small scale.

Figure 1:
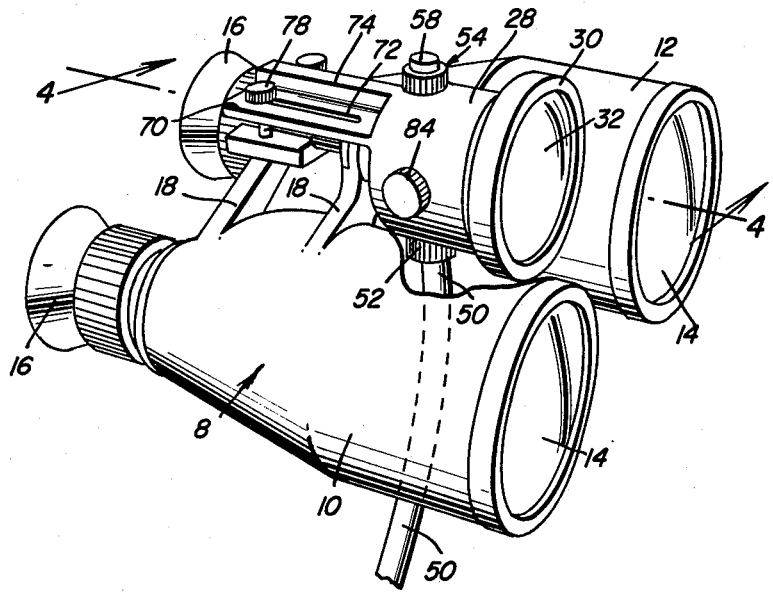
FIGURE 1 is a view in perspective of a conventional pair of binoculars equipped with the attachable and variable illumination means constituting the chief feature of the herein disclosed invention.
Figure 2:
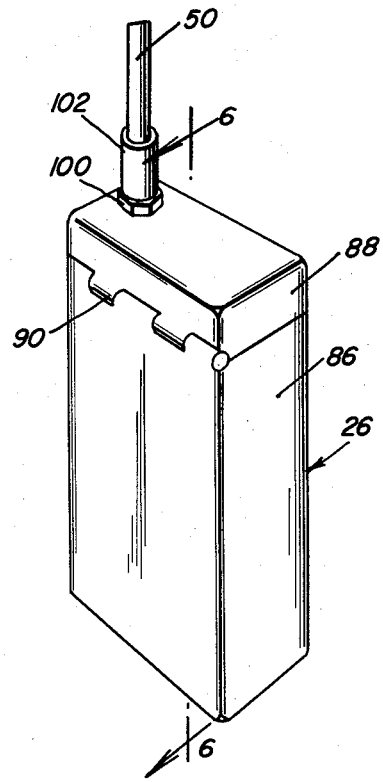
FIGURE 2 is a view in perspective of the battery case.
Figure 3:
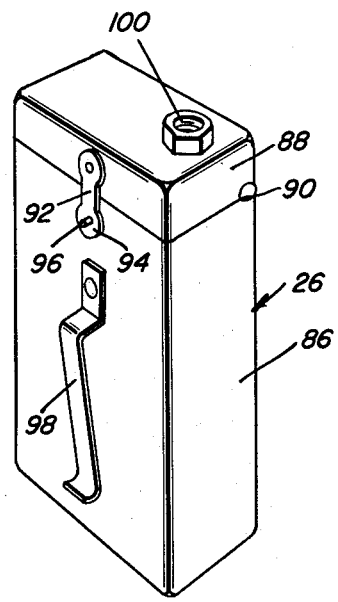
FIGURE 3 is also a view in perspective of the battery case observing the front side thereof and wherein the case is detached from the current conductor.

Referring now to the views of the drawings and more particularly to FIG. 1 the numeral 8 designates, generally construed, binoculars which, insofar as the present disclosure is concerned are conventional. With further reference to FIG. 1 the numerals 10 and 12 designate companion barrels having suitably construed and attached lenses 14 at their outer or distal ends. The eyepieces at the inner or proximal ends are denoted at 16. The lateral spaced parallel barrel assembling and supporting arms are denoted at 18 and the adjacent ends are hingedly connected with the usual hinge pin or shaft 20 (FIG. 4). These component parts 18 and 20 go to make up, generally speaking, the frame means joining the barrels to each other. The source of illumination is denoted generally by the numeral 22, the attaching and bracketing means therefor is designated at 24 and the battery case is designated at 26. The means 22 comprises a horizontal cylinder 28 provided at its forward or righthand end (FIGS. 1 and 4) with a suitable rim 30 supporting a lens 32, a ring nut 34 which retains the same in place in the manner shown, a reflector 36 and a lamp or bulb 38. On the interior the housing portion of the cylinder is provided with a relatively fixed L-shaped contact element 40 which has a limb or finger 42 arranged to accommodate a coacting finger 44 on the companion fixedly mounted contact element 46 carried by the inner end 48 of the cylinder. The current conductor, generally denoted at 50, is flexible and has its current delivery end fitting into a collar or neck 52 provided therefor on the cylinder.

With reference now to the readily accessible off and on switch button, this is referred to, generally speaking, by the numeral 54. It comprises a spring-loaded button provided with a shank 56 joined with the finger 42, has the button proper 58, shouldered component 60 and coil spring 62 encircling the shank or stem 56 and confined in the circular neck 64 equipped with an accessible screw cap 66.

It will be noted that the switch or switch button is located on the top of the inner end of the cylinder where it is convenient and in line with the means 24 bracketing the cylinder on the frame part of the binoculars. With reference now to the clamping means this comprises a bracket member 68 having flange portions 70 with slots 72 therein and the centralized upstanding rib 74. It should be noted that the rib is commensurate in length with the length of the over-all bracket, is coplanar with the cooperating top portion of the cylinder 28 and is alined with the switch button 58. The slots serve to accommodate the screw-threaded shank portions of the assembling and retaining screws 78 which are accessibly arranged and which have their shanks threaded into screw-threaded sockets 76 provided therefor in the clamping plate or cleat 80. This cleat has a semi-circular groove 82 which embraces and seats the aforementioned shaft or hinge pin 20. The numeral 84 designates the knob of a suitable rheostat. This knob is arranged on one side of the switch button and serves to control the intensity of the projected beam of light. The fact that the rib 74 is flush with the top portion of the cylinder 28 and is in line with the switch permits it to perform as a "feeler" and guide. Thus, the user's fingers can be readily and reliably located at all times. Accordingly, the rib 74, button 58 and knob 84 are thus oriented for expedient accessibility and convenient handling.

The battery case 26 comprises the case proper 86 with a cover 88 hinged in place at 90, said cover provided with a pivoted latch 92 having an end portion 94 engageable with the keeper 96 to keep the cover closed. The numeral 98 designates an appropriate clip which may be employed for attaching the battery case to the user's belt (not shown). The numeral 100 designates an appropriate socket for the end portion 102 of the cable or conductor which has a current delivering plug 104 connected thereto and cooperating with the contact 106 in the interior of the battery case. The batteries are denoted at 108 and are suitably arranged in the manner illustrated, current being delivered therefrom to the plug means by way of the coacting conductors or contact elements 110 and 112 as the case may be.

The attachment is clamped or bracketed on the frame means of the binoculars in the manner shown. It is within the purview of the concept to install this light source at the factory or to construct it as an attachment capable of optional use by the user of the binoculars. Manifestly this light source is in a place of vantage when applied and can be used in the manner illustrated in FIG. 1. The intensity or magnification of light selected depends upon the particular needs of the user. It also depends to some extent on whether the binoculars are to be held when in use in the hands without support or whether a separate support (not shown) is used. With high grade prism-type binoculars desirably favorable conditions and results for optimum effect are dependent on the construction or model of binoculars used. However and since special binoculars are often provided for twilight capacity and night efficiency it will be evident that proper selection and use of the light source herein disclosed will greatly add to the overall utility in respect to relative brightness and clear focusing on the image or object which is being brought into focus for viewing.

It is submitted that a careful consideration of the specification in conjunction with the views of the drawings will enable the reader to obtain a clear and comprehensive understanding of the overall invention, the features and advantages and manner of achieving contemplated results. Consequently a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, binoculars embodying a pair of duplicate sighting and viewing barrels having distal ends provided with lenses and inner proximal ends embodying eyepieces, frame means interconnecting said proximal ends, said frame means including paired lateral arms fixed to the respective proximal end portions of said barrels, said arms having cooperating ends joined together by a connecting hinge pin normally occupying a plane above the plane of said barrels, a bracket having forward and rearward ends, the rearward end of said bracket residing flatwise atop said hinge pin and being separably connected to said hinge pin by a clamping plate which is separably connected to the rearward end of said bracket, said bracket further having a straight elongated rib having a longitudinal top surface, said rib and surface providing a finger orienting guide, a light source designed and adapted to beam a light forwardly in a plane above top portions of the aforementioned barrels, said light source embodying a cylinder having a rearward end eccentrically connected to the cooperating forward end of said bracket, said cylinder having lamp means enclosed therein and cooperating lens means at its forward end, said cylinder being poised and assuming an operating position above the customary existing space between the respective barrels, said cylinder being centrally provided on the top of said rearward end with switch means including an available finger-operated spring-loaded pushbutton, normally open contact means housed in said cylinder, said pushbutton having cooperating and operating connection with said contact means, said pushbutton being in alignment with but in a plane above the finger guide surface of said rib, and rheostat means operatively embodied in said cylinder and electrically cooperable with said contact means, said rheostat means including a finger-controlled operating knob, said knob being mounted for operation on an exterior of one side of the rearward end of said cylinder, being in a plane below said rib and in close proximity to said pushbutton whereby with the aid of the rib, pushbutton and close-at-hand operating knob, the beam of light from said light source is operable at will.

2. An attachment for the frame means embodied in a pair of binoculars comprising: a cylinder having a forward end embodying a reflector, lens clamping means assembling said lens, said reflector having a lamp bulb cooperable therewith, contact members confined within the cylinder and cooperating in providing circuit make and break means, additional means on a bottom side of a rearward end portion of said cylinder to accommodate an attachable and detachable current supplying conductor, said means being cooperatively embodied in said circuit make and break means, said cylinder being provided on the top side thereof with a socket provided with an attached cap, said cap being provided with a spring loaded pushbutton, said pushbutton embodying a shank cooperable with a coacting contact member in a manner to press the contact members together to close the circuit, an elongated bracket having a forward end eccentrically connected to a rearward end of said cylinder, said bracket embodying a linearly straight elongated rib provided along its respective lengthwise sides with outstanding slotted coplanar flanges, said rib having a top surface flush with the top of said cylinder, said rib constituting a finger-positioning, orienting and guiding member which is in alignment at its forward end with said pushbutton, and a bracket-assembling and clamping plate having headed screw-threaded fasteners detachably and adjustably connected with the slotted flanges on said bracket, rheostat means operatively mounted within the confines of said cylinder and electrically connected with said circuit break and make means and provided on an exterior side of said cylinder with a finger-operated control knob, said knob being adjacent to and coordinated with said switch button whereby the knob, switch button and rib on said bracket means, being thus oriented, easy control and handling thereof and also of the binoculars is assured.

3. An attachment for barrel assembling and hinging frame means embodied in a pair of binoculars characterized by a pair of side-by-side barrels comprising: a light source embodying a cylinder having enclosed lamp means, lens means cooperating with the cylinder and lamp means, said cylinder being provided centrally at the top of the rearward end thereof with switch means including an available finger-operated spring-loaded pushbutton, normally open contact means housed in the cylinder, said pushbutton having cooperating and operating connection with intended component parts of said contact means, said cylinder being provided on one side of the rearward end portion with rheostat means operatively embodied and cooperable with said contact means, said rheostat means including a finger-controlled operating knob, said knob being mounted for operation on an exterior of one side of the rearward end of said cylinder, being in a plane below said spring-loaded pushbutton, additional means on the bottom central portion of the rearward end of said cylinder and diametrically opposite said pushbutton and proximal to said knob and adapted to accommodate a readily attachable and detachable current supply conductor, an elongated rigid bracket for mounting said cylinder on a stock hinge pin embodied in the aforementioned frame means, said bracket embodying a linearly straight elongated rib, said rib being provided along its respective longitudinal sides with outstanding slotted coplanar flanges, said slotted flanges adapted to accommodate attaching and fastening means on a clamping plate for said bracket, said rib having a forward end eccentrically connected with a rearward end portion of said cylinder, said rib constituting a finger-positioning, orienting and guiding member and being disposed in alignment at its forward end with said pushbutton, said rib also having predetermined coordinate relationship with the aforementioned rheostat knob whereby said rib, switch button and knob being thus related to each other to insure easy control and handling of the binoculars and also said light source.

References Cited in the file of this patent

UNITED STATES PATENTS

| | | |
|---|---|---|
| 516,086 | Easley | Mar. 6, 1894 |
| 554,459 | Rockwell | Feb. 11, 1896 |
| 1,512,705 | Margretten et al. | Oct. 21, 1924 |
| 1,644,125 | Harris | Oct. 4, 1927 |
| 1,947,975 | Dianovszky | Feb. 20, 1934 |
| 2,230,458 | Hummert | Feb. 4, 1941 |
| 2,383,186 | Glasser | Aug. 21, 1945 |
| 2,401,014 | Paul | May 28, 1946 |
| 2,769,895 | Boord | Nov. 6, 1956 |
| 2,787,470 | Barrus et al. | Apr. 2, 1957 |
| 2,882,388 | Garland | Apr. 14, 1959 |
| 3,071,682 | Belgard | Jan. 1, 1963 |

OTHER REFERENCES

Scientific American, Oct. 24, 1914 (vol. CXI, No. 17, page 334).